(12) United States Patent
Mahgerefteh

(10) Patent No.: US 10,663,659 B2
(45) Date of Patent: *May 26, 2020

(54) ECHELLE GRATING DEMUX/MUX IN SIN

(71) Applicant: Finisar Corporation, Sunnyvale, CA (US)

(72) Inventor: Daniel Mahgerefteh, Los Angeles, CA (US)

(73) Assignee: II-VI Delaware Inc., Wilmington (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,425

(22) Filed: Jun. 11, 2019

(65) Prior Publication Data

US 2019/0346623 A1 Nov. 14, 2019

Related U.S. Application Data

(63) Continuation of application No. 15/885,544, filed on Jan. 31, 2018, now Pat. No. 10,317,621.

(Continued)

(51) Int. Cl.
*G02B 6/12* (2006.01)
*G02B 6/293* (2006.01)
(Continued)

(52) U.S. Cl.
CPC ........ *G02B 6/12014* (2013.01); *G01J 3/0221* (2013.01); *G01J 3/0259* (2013.01); *G01J 3/1809* (2013.01); *G02B 5/1809* (2013.01); *G02B 5/1814* (2013.01); *G02B 5/1861* (2013.01); *G02B 6/124* (2013.01); *G02B 6/12007* (2013.01); *G02B 6/29326* (2013.01); *G02B 6/1203* (2013.01); *G02B 6/12019* (2013.01)

(58) Field of Classification Search
CPC ............ G02B 6/12014; G02B 6/29326; G02B 5/1861; G02B 6/12019; G02B 6/1203; G01J 3/1809
See application file for complete search history.

(56) References Cited

U.S. PATENT DOCUMENTS 10,317,621 B2 * 6/2019 Mahgerefteh ...... G02B 6/12014
2017/0048016 A1 2/2017 Li et al.

OTHER PUBLICATIONS

U.S. Appl. No. 15/885,544 Office Action dated Oct. 5, 2018, 8pgs.

* cited by examiner

*Primary Examiner* — John Bedtelyon
(74) *Attorney, Agent, or Firm* — Maschoff Brennan

(57) ABSTRACT

In an example, an Echelle grating wavelength division multiplexing (WDM) device includes a first waveguide, a slab waveguide, multiple second waveguides, an Echelle grating, and a metal-filled trench. The first waveguide includes either an input waveguide or an output waveguide. The multiple second waveguides are optically coupled to the first waveguide through the slab waveguide. The multiple second waveguides include multiple output waveguides if the first waveguide includes the input waveguide or multiple input waveguides if the first waveguide includes the output waveguide. The Echelle grating includes multiple grating teeth formed in the slab waveguide. The metal-filled trench forms a mirror at the grating teeth to reflect incident light from the first waveguide toward the multiple second waveguides or from the multiple second waveguides toward the first waveguide.

20 Claims, 3 Drawing Sheets

Related U.S. Application Data

(60) Provisional application No. 62/452,787, filed on Jan. 31, 2017.

(51) Int. Cl.
*G02B 5/18* (2006.01)
*G01J 3/18* (2006.01)
*G01J 3/02* (2006.01)
*G02B 6/124* (2006.01)

ECHELLE GRATING DEMUX/MUX IN SIN

CROSS-REFERENCE TO RELATED APPLICATION

The present application is a Continuation of U.S. patent application Ser. No. 15/885,544, filed Jan. 31, 2018, which claims the benefit of and priority to U.S. Provisional Patent Application No. 62/452,787, filed on Jan. 31, 2017. Both applications are incorporated herein by reference.

FIELD

The embodiments discussed herein are related to an Echelle grating demultiplexer (demux) or multiplexer (mux) in silicon nitride (SiN).

BACKGROUND

Unless otherwise indicated herein, the materials described herein are not prior art to the claims in the present application and are not admitted to be prior art by inclusion in this section.

In some Echelle grating demuxes, input light with n (e.g., n=4 or other positive integer) different wavelength channels enters the demux through an input waveguide. From there, the light diffracts in a free-space propagation region and impinges on a grating that is on a Roland circle and has blazed angles. Light reflects from the grating leading to constructive interference for each of n input wavelengths (associated with the n wavelength channels) at n output waveguides, thereby spatially separating, or demultiplexing, the n wavelength channels from each other.

The subject matter claimed herein is not limited to implementations that solve any disadvantages or that operate only in environments such as those described above. Rather, this background is only provided to illustrate one example technology area where some implementations described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to Echelle grating demux/mux in SiN.

In an example embodiment, an Echelle grating wavelength division multiplexing (WDM) device includes a first waveguide, a slab waveguide, multiple second waveguides, an Echelle grating, and a metal-filled trench. The first waveguide includes either an input waveguide or an output waveguide. The multiple second waveguides are optically coupled to the first waveguide through the slab waveguide. The multiple second waveguides include multiple output waveguides if the first waveguide includes the input waveguide or multiple input waveguides if the first waveguide includes the output waveguide. The Echelle grating includes multiple grating teeth formed in the slab waveguide. The metal-filled trench forms a mirror at the grating teeth to reflect incident light from the first waveguide toward the multiple second waveguides or from the multiple second waveguides toward the first waveguide.

In another example embodiment, an Echelle grating demux includes an input waveguide, a slab waveguide, an Echelle grating, and a broadband mirror. The multiple output waveguides are optically coupled to the input waveguide through the slab waveguide. The Echelle grating is formed in a SiN layer of a silicon (Si) photonic integrated circuit (PIC). The Echelle grating includes multiple grating teeth formed in the slab waveguide. The multiple grating teeth have a pitch of less than 300 nanometers (nm). The broadband mirror is located at the multiple grating teeth and is encapsulated at least 240 nm below a top surface of the Si PIC.

In another example embodiment, a method to form a Si PIC that includes an Echelle grating demultiplexer (demux) or multiplexer (mux) in a complementary metal-oxide-semiconductor (CMOS) fabrication process. The method may include forming a Si substrate, a buried oxide (BOX) layer above the Si substrate, and a Si layer with one or more active devices above the BOX layer in a front end of line (FEOL) process of the CMOS fabrication process. The method may also include forming above the Si layer one or more dielectric and metallization layers, including a SiN layer, in a back end of line (BEOL) process of the CMOS fabrication process. Forming the one or more dielectric and metallization layers may include forming a SiN slab waveguide in the SiN layer, forming an Echelle grating with multiple grating teeth in the SiN slab waveguide, forming a trench separating the multiple grating teeth in the SiN slab waveguide from a dielectric cladding material in the SiN layer; and forming a mirror in the trench.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

One element of an Echelle grating demux is a mirror at each tooth of the grating. Some Echelle grating demuxes use distributed Bragg reflector (DBR) mirrors. The mirror used in the demux may have a suitable bandwidth to reflect all n wavelength channels. For four wavelength channels spanning 1271-1340 nm, the mirror may be a broadband mirror. Broadband DBR mirrors exist but may require pitches (e.g., tooth-to-tooth intervals) of less than 300 nm. It may be difficult or impossible to manufacture DBR mirrors with pitches less than 300 nm in SiN layers of Si PICs.

Embodiments described herein generally relate to an Echelle grating demux in SiN. The same or a similar configuration can be implemented for an Echelle grating mux in SiN. In general, an Echelle grating demux may include an input waveguide, multiple output waveguides, a SiN slab waveguide, an Echelle grating with grating teeth, and a metal-filled trench forming a mirror at the grating teeth and disposed between the SiN slab waveguide and a dielectric cladding material. In general, an Echelle grating mux may include multiple input waveguides, an output waveguide, a SiN slab waveguide, an Echelle grating with grating teeth, and a metal-filled trench forming a mirror at the grating teeth and disposed between the SiN slab waveguide and a dielectric cladding material. For simplicity, the following discussion describes one or more example structures and/or implementations of an Echelle grating demux, with the understanding that the same structure(s)/implementation(s) can be used as an Echelle grating mux with appropriate modifications being made, e.g., using the multiple output waveguides and a single input waveguide of the demux instead as, respectively, multiple input waveguides and a single output waveguide of the mux. The term Echelle grating WDM device may be used herein as a categorical term encompassing both Echelle grating WDM demux devices and Echelle grating WDM mux devices.

Figure 1:
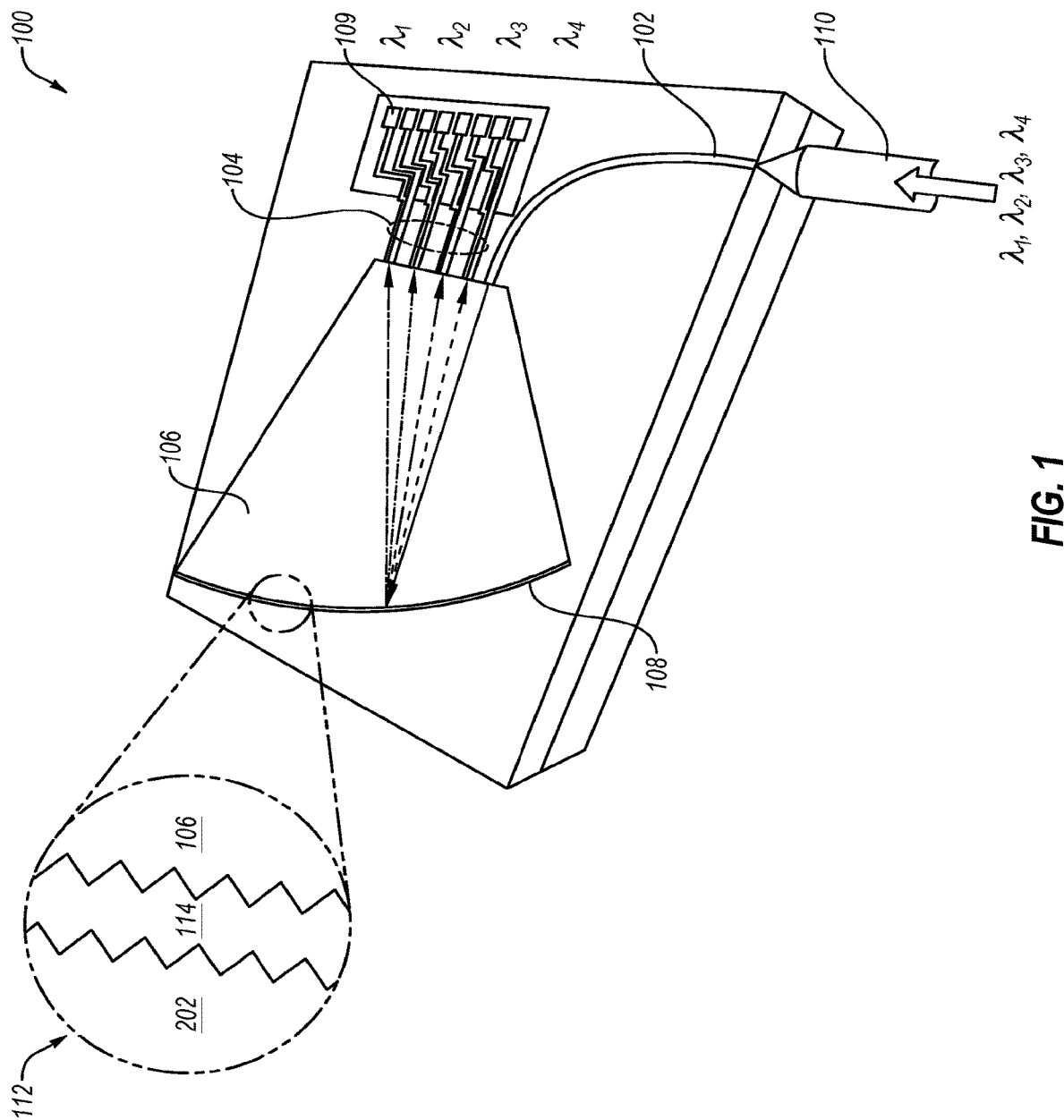
FIG. 1 illustrates a top perspective view of an example Echelle grating wavelength divisional multiplexing (WDM) demux.

FIG. 1 illustrates a top perspective view of an example Echelle grating WDM demux 100 (hereinafter "WDM demux 100"), arranged in accordance with at least one embodiment described herein. The WDM demux 100 includes an input waveguide 102, output waveguides 104, a free-space slab waveguide 106 (hereinafter "slab waveguide 106"), and a DBR-assisted Echelle grating 108. One or more of the output waveguides 104 may each be implemented as a silicon (Si) waveguide photodetector such that the WDM demux 100 may include multiple Si waveguide photodetectors, each included in or as part of a different one of the output waveguides 104. Accordingly, one or more of the output waveguides 104 may be electrically coupled to one or more corresponding contact pads 109 (only one of the contact pads is labeled in FIG. 1 for simplicity). Any or all of the input waveguide 102, the output waveguides 104, the slab waveguide 106, the Echelle grating 108, and/or the contact pads may be fabricated on or in a Si PIC. The Si PIC may include modulators, waveguides, detectors, couplers, and/or other optical components in a Si on Insulator (e.g., silicon on silicon dioxide ($SiO_2$) box layer) on Si substrate.

The input waveguide 102 may be optically coupled to a lensed fiber 110. The input waveguide 102 may receive from the lensed fiber 110 an input signal (e.g., light), which may include multiple distinct wavelength channels. The various wavelength channels are referred to in FIG. 1 as $\lambda_1$, $\lambda_2$, $\lambda_3$, and $\lambda_4$ in FIG. 1. The input signal may travel through the input waveguide 102 and through the slab waveguide 106 toward the Echelle grating 108. The Echelle grating 108 may divide the input signal into the distinct wavelength channels. The Echelle grating 108 may also direct (e.g., reflect) the distinct wavelength channels to the output waveguides 104. In particular, each of the distinct wavelength channels may generally be directed to a distinct one of the output waveguides 104.

In other embodiments, the WDM demux 100 may be implemented as a multiplexer, referred to as a WDM demux. In such an embodiment, the output waveguides 104 may instead by implemented as input waveguides and the input waveguide 102 may instead be implemented as an output waveguide, where each of the output waveguides 104 (each implemented as an input waveguide) inputs a distinct wavelength channel (e.g., from a corresponding optical signal source) into the slab waveguide 106, where the distinct wavelength channels are combined onto a common optical path by the Echelle grating 108 and directed back toward and all output through the input waveguide 102 (implemented as an output waveguide).

FIG. 1 additionally includes an inset 112 depicting in greater detail an example implementation of at least a portion of the Echelle grating 108. As depicted in the inset 112, the Echelle grating 108 includes multiple grating teeth which may be arranged on a portion of a perimeter of a Roland Circle, for instance, and with blazed angles. Thus, the light from the input waveguide 102 may diffract in a free-space propagation region of the slab waveguide 106 and reflect from the Echelle grating 108 leading to constructive interference for each of the distinct wavelength channels at corresponding ones of the output waveguides 104, thereby separating (or demultiplexing) the distinct wavelength channels, as generally already described above. For an example coarse wavelength division multiplexing (CWDM) application, the distinct wavelength channels $\lambda_1$, $\lambda_2$, $\lambda_3$, and $\lambda_4$ may span a wavelength range of 1271 nanometers (nm) to 1340 nm, a range of approximately 70 nm.

As illustrated in the inset 112 of FIG. 1, the teeth of the Echelle grating 108 may be backed by a mirror or mirrors 114 (hereinafter "mirror 114"). In some conventional implementations, the mirror 114 may include a distributed Bragg reflector (DBR) mirror. For some CWDM applications, e.g., that may span 70 nm or more, the mirror 114 may need to be a broadband mirror to reflect all of the distinct wavelength channels of interest. A DBR mirror may be broadband, but may require a pitch (e.g., tooth center-to-tooth center spacing) of less than 300 nm. While writing a DBR grating/mirror with a pitch of 300 nm may not be particularly problematic in general, it may be difficult or impossible to encapsulate such a grating at a depth of 240-600 nm deep in a Si PIC according to known fabrication processes.

Figure 2:
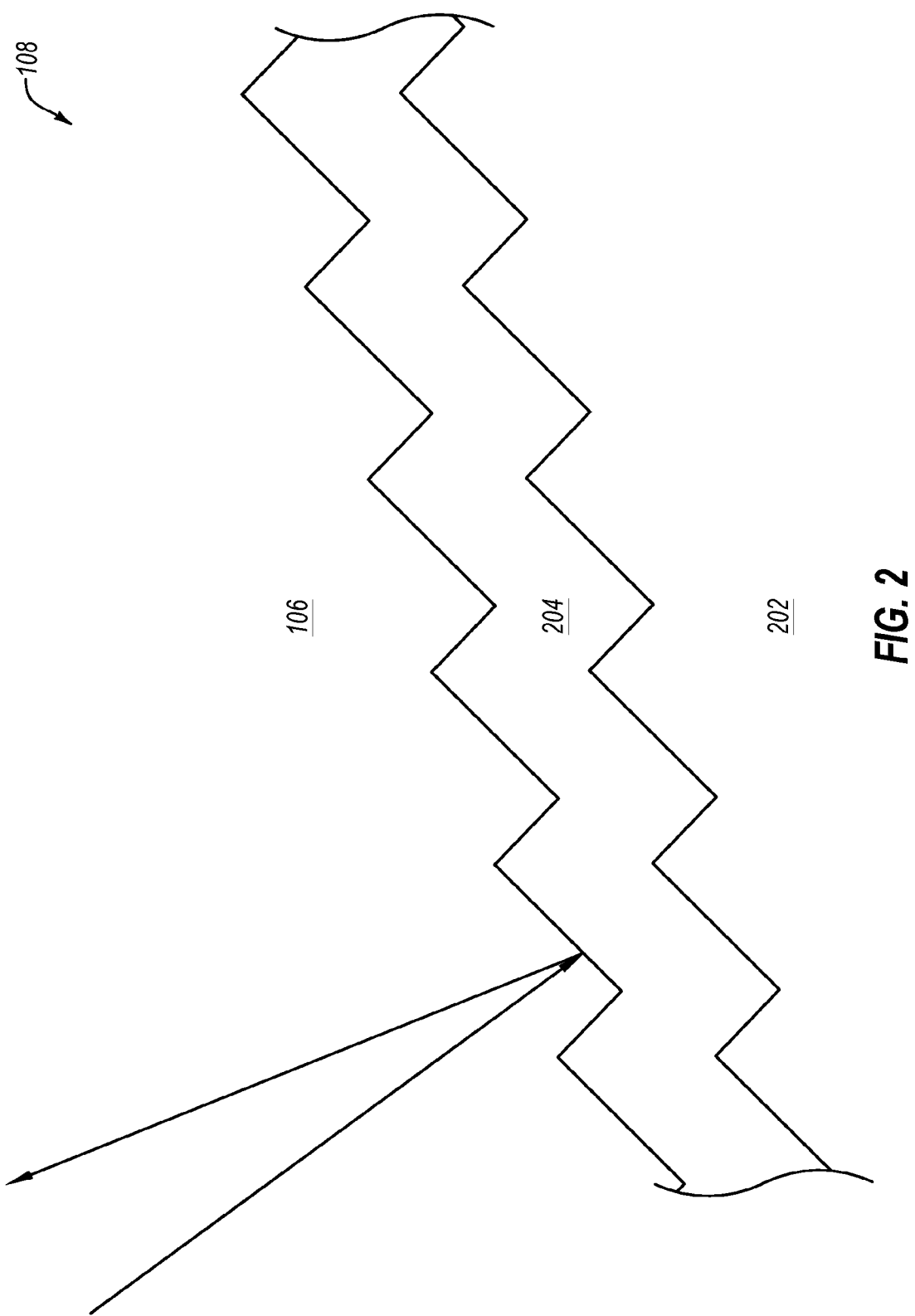
FIG. 2 is a detail view of an example implementation of at least a portion of an Echelle grating included in the Echelle grating WDM demux of FIG. 1.

FIG. 2 is a detail view of an example implementation of at least a portion of the Echelle grating 108 of FIG. 1, arranged in accordance with at least one embodiment described herein. FIG. 2 includes a portion of the slab waveguide 106 (labeled "SiN slab" in FIG. 2), the portion of the Echelle grating 108, a portion of a cladding material 202, and a mirror or mirrors 204 (hereinafter "mirror 204"). The slab waveguide 106 may include silicon nitride (SiN). The cladding material 202 may include silicon dioxide ($SiO_2$) or other dielectric. The mirror 204 may include a metal-filled trench bounded by one wall formed by the slab waveguide 106 and by another wall formed by the cladding material 202. In an example implementation, the mirror 204 may include tungsten, aluminum or another suitable metal.

Tungsten has a reflectivity of about 70% at 1310 nm, which may correspond to about a 1.5 decibel (dB) reflectivity loss according to some example implementations. Tungsten may also have a broadband reflectivity response at about 1310 nm. For instance, tungsten may have a reflectivity of about 70% or higher for wavelengths in a range from 1271 nm to 1340 nm.

Figure 3:
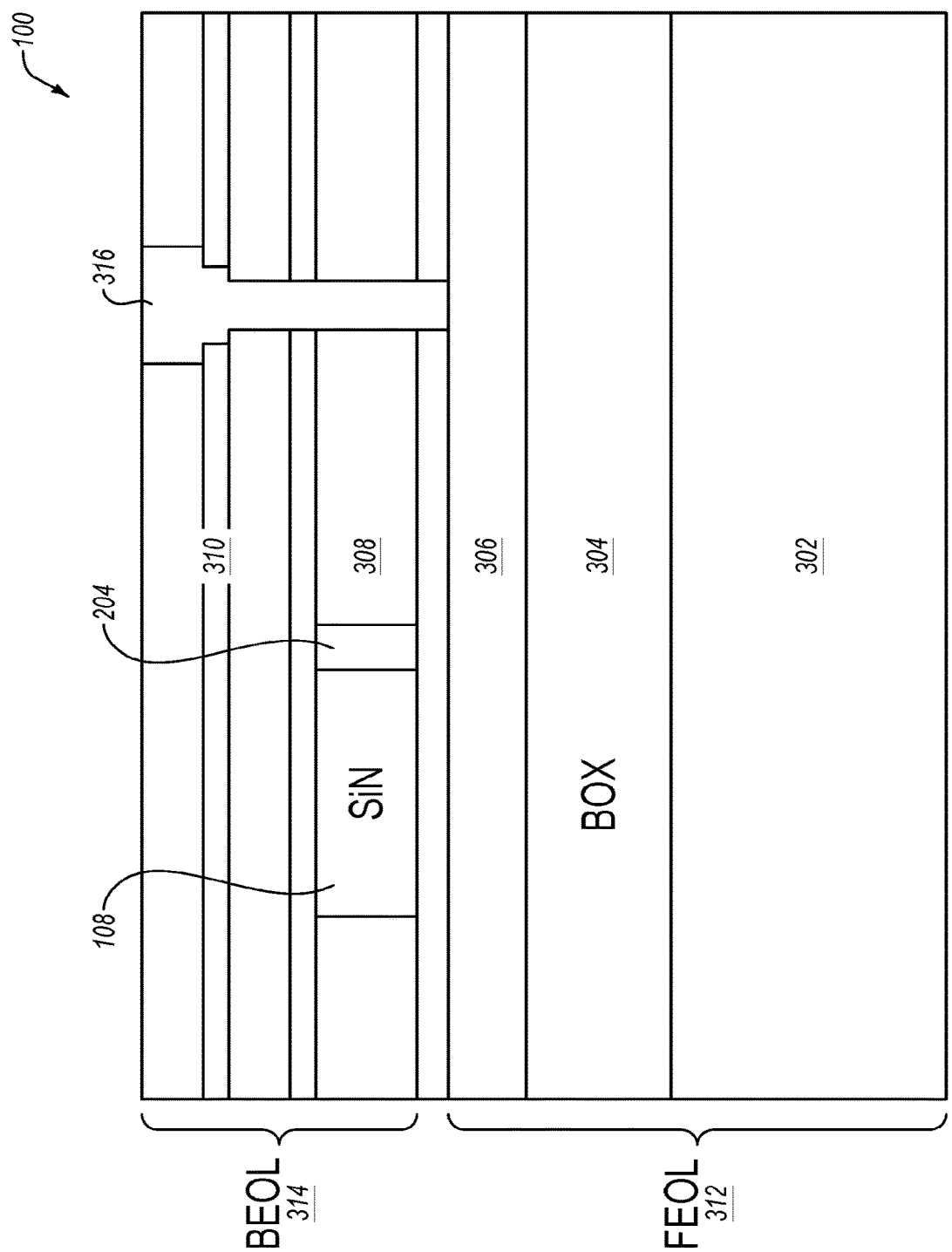
FIG. 3 is a cross-sectional side view of an example implementation of the Echelle grating WDM demux of FIG. 1, all arranged in accordance with at least one embodiment described herein.

FIG. 3 is a cross-sectional side view of an example implementation of the WDM demux 100 of FIG. 1, arranged in accordance with at least one embodiment described herein. As illustrated, the WDM demux 100 includes a Si substrate 302, a buried oxide (BOX) layer 304, a Si layer 306 (including one or more Si waveguides and/or active optical devices such as modulators and photodiodes, as well as surrounding $SiO_2$ or other dielectric), at least one SiN layer 308 (including one or more SiN waveguides (e.g., slab waveguide 106) and/or SiN optical devices, as well as surrounding $SiO_2$ or other dielectric), and/or one or more dielectric/metallization layers 310.

An Si photonic platform, such as is illustrated in FIG. 3, that includes at least one SiN layer (such as the SiN layer 308 of FIG. 3) may be referred to as a SiN platform. SiN platforms in Si photonics may include one or more advantages, such as integration of adiabatic coupler for broadband coupling, reduced temperature variation of refractive index of SiN for use in optical demultiplexer in un-cooled systems, as well as lower loss and reduced sensitivity of performance of passive devices in SiN relative to fabrication/process variations.

Some known Si photonics fabrication processes may be separated into a so-called front end of line (FEOL) process and a so-called back end of line (BEOL) process. The FEOL process may fabricate, e.g., the Si substrate 302, the BOX layer 304, and the Si layer 306 including one or more active devices. The Si substrate 302, the BOX layer 304, and the Si layer 306 may be collectively referred to as FEOL layers 312. The BEOL process may fabricate one or more passive layers on top of the FEOL layers, e.g., the SiN layer 308 and the dielectric/metallization layers 310, collectively referred to as BEOL layers 314. The BEOL layers 314 may generally include dielectric layers and metal-filled trenches and/or metallized pillars 316 used to make electrical contact to active devices such as modulators and photodiodes in the FEOL layers 312. Alternatively or additionally, such a metal-filled trench in one or more of the BEOL layers 314 may form the mirror 204 as described in more detail below.

Embodiments described herein take advantage of the fact that metal is allowed in the BEOL process on the same layer as the SiN (e.g., in the SiN layer 308) in order to form metal optical mirrors 204 for the Echelle grating 108 for broadband reflectivity. Such a configuration as disclosed herein may make the design compatible with CMOS foundry rules, which may facilitate manufacturability of a practical Si photonic device.

Embodiments described herein may additionally include a method to form a Si PIC that includes an Echelle grating demux or mux in CMOS fabrication process. The method may include forming a Si substrate, a BOX layer above the Si substrate, and a Si layer with one or more active devices above the BOX layer in a FEOL process of the CMOS fabrication process. The method may also include forming above the Si layer one or more dielectric and metallization layers, including a SiN layer, in a BEOL process of the CMOS fabrication process.

Forming the one or more dielectric and metallization layers may include forming a SiN slab waveguide in the SiN layer. Forming the one or more dielectric and metallization layers may also include forming an Echelle grating with multiple grating teeth in the SiN slab waveguide, including forming the grating teeth on a portion of a perimeter of Roland Circle and with blazed angles. Forming the one or more dielectric and metallization layers may also include forming a trench separating the multiple grating teeth in the SiN slab waveguide from a dielectric cladding material in the SiN layer. Forming the one or more dielectric and metallization layers may also include forming a mirror in the trench.

Forming the mirror in the trench may include filling the trench with a metal. Alternatively or additionally, forming the mirror in the trench may include filling the trench with tungsten.

Forming the one or more dielectric and metallization layers may include forming one or more metallized pillars in and/or through one or more of the BEOL layers, where the metallized pillars individually provide electrical access between the top of the Si PIC and the one or more active devices. In some embodiments, the metal-filled trench that forms the mirror may be formed in one or more of the same layers of the BEOL layers in which the one or more metallized pillars are formed.

The metal that fills the trench to form the mirror may be the same metal as used in the BEOL process to also make the one or more metallized pillars. Alternatively, the metal that fills the trench to form the mirror may be different than the metal used to make the one or more metallized pillars.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting and are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An Echelle grating wavelength division multiplexing (WDM) device, comprising:
   a first waveguide comprising an input waveguide or an output waveguide;
   a slab waveguide;
   multiple second waveguides optically coupled to the first waveguide through the slab waveguide, the multiple second waveguides comprising multiple output waveguides if the first waveguide comprises the input waveguide or multiple input waveguides if the first waveguide comprises the output waveguide;
   an Echelle grating that includes multiple grating teeth formed in the slab waveguide; and
   a trench that forms a mirror at the grating teeth to reflect incident light from the first waveguide toward the multiple second waveguides or from the multiple second waveguides to the first waveguide;
   wherein the Echelle grating and the trench are encapsulated below a top surface of a silicon (Si) photonic integrated circuit (PIC).

2. The Echelle grating WDM device of claim 1, further comprising a cladding material positioned to an opposite side of the mirror from the slab waveguide, wherein the slab waveguide comprises silicon nitride (SiN) and the cladding material comprises silicon dioxide ($SiO_2$).

3. The Echelle grating WDM device of claim 1, wherein the trench is filled with tungsten.

4. The Echelle grating WDM device of claim 1, wherein the mirror has a broadband reflectivity of at least 70%.

5. The Echelle grating WDM device of claim 4, wherein the mirror has the broadband reflectivity of at least 70% over a wavelength range of at least 70 nanometers.

6. The Echelle grating WDM device of claim 1, wherein at least the slab waveguide and the trench are formed in a back end of line (BEOL) process of a complementary metal-oxide-semiconductor (CMOS) fabrication process used to form the Echelle grating WDM device.

7. The Echelle grating WDM device of claim 1, wherein the Echelle grating and the trench are encapsulated at least 240 nanometers (nm) below the top surface of the Si PIC, the Echelle grating and the trench included in the Si PIC.

8. The Echelle grating WDM device of claim 7, wherein the Echelle grating and the trench are encapsulated 240 nm to 600 nm below the top surface of the Si PIC.

9. The Echelle grating WDM device of claim 7, wherein the grating teeth have a pitch less than 300 nanometers.

10. An Echelle grating wavelength division multiplexing (WDM) device, comprising:
a first waveguide comprising an input waveguide or an output waveguide;
a slab waveguide comprising silicon nitride (SiN);
multiple second waveguides optically coupled to the first waveguide through the slab waveguide, the multiple second waveguides comprising multiple output waveguides if the first waveguide comprises the input waveguide or multiple input waveguides if the first waveguide comprises the output waveguide;
an Echelle grating; and
a trench that forms a mirror to reflect incident light from the first waveguide toward the multiple second waveguides or from the multiple second waveguides to the first waveguide, the trench defined by a toothed wall formed by a cladding material and spaced apart from a toothed wall formed by the slab waveguide.

11. The Echelle grating WDM device of claim 10, further comprising a cladding material positioned to an opposite side of the mirror from the slab waveguide, wherein the slab waveguide comprises silicon nitride (SiN) and the cladding material comprises silicon dioxide ($SiO_2$).

12. The Echelle grating WDM device of claim 10, wherein the mirror has a broadband reflectivity of at least 70%.

13. The Echelle grating WDM device of claim 12, wherein the mirror has the broadband reflectivity of at least 70% over a wavelength range of at least 70 nanometers.

14. The Echelle grating WDM device of claim 10, wherein the Echelle grating and the trench are encapsulated at least 240 nanometers (nm) below the top surface of the Si PIC, the Echelle grating and the trench included in the Si PIC.

15. The Echelle grating WDM device of claim 14, wherein the Echelle grating includes multiple grating teeth formed in the slab waveguide and wherein the grating teeth have a pitch less than 300 nanometers.

16. An Echelle grating multiplexer (mux), comprising:
an output waveguide;
a slab waveguide;
multiple input waveguides optically coupled to the output waveguide through the slab waveguide;
an Echelle grating formed in a silicon nitride (SiN) layer of a silicon (Si) photonic integrated circuit (PIC), the Echelle grating including multiple grating teeth formed in the slab waveguide, the multiple grating teeth having a pitch of less than 300 nanometers (nm); and
a broadband mirror located at the multiple grating teeth and encapsulated below a top surface of the Si PIC.

17. The Echelle grating mux of claim 16, wherein the broadband mirror comprises a metal-filled trench formed in the SiN layer between a cladding material and the multiple grating teeth of the Echelle grating and the slab waveguide.

18. The Echelle grating mux of claim 16, wherein the broadband mirror comprises a mirror with a reflectivity of at least 70% over a wavelength range of at least 70 nm.

19. The Echelle grating mux of claim 16, wherein the Echelle grating and the broadband mirror are encapsulated at least 240 nanometers (nm) below the top surface of the Si PIC.

20. The Echelle grating mux of claim 16, wherein the Echelle grating and the broadband mirror are encapsulated 240 nm to 600 nm below the top surface of the Si PIC.

* * * * *